United States Patent [19]

Kramer

[11] 3,725,500
[45] Apr. 3, 1973

[54] CATALYST MIXTURE OF ALUMINUM HALO BROMIDE AND SULFUR OXO HALIDE AND ITS USE IN ISOMERIZATION

[75] Inventor: George M. Kramer, Berkeley Heights, N.J.

[73] Assignee: Esso Research and Engineering Company

[22] Filed: Sept. 28, 1971

[21] Appl. No.: 184,613

Related U.S. Application Data

[63] Continuation of Ser. No. 862,046, Sept. 29, 1969, abandoned.

[52] U.S. Cl. ...... 260/683.68, 260/666 P, 260/683.75, 252/439
[51] Int. Cl. ........................... C07c 5/28, B01j 11/74
[58] Field of Search ......... 260/683.68, 683.7, 683.75, 260/683.76, 683.77, 683.78; 252/439, 441, 442

[56] References Cited

UNITED STATES PATENTS

| | | | |
|---|---|---|---|
| 2,286,129 | 6/1942 | Veltman | 260/683.7 |
| 2,376,509 | 5/1945 | Sachanen et al. | 260/683.68 |
| 2,890,251 | 6/1959 | Flavin et al. | 260/683.7 |
| 2,536,841 | 1/1951 | Dornte et al. | 252/439 |

*Primary Examiner*—Delbert E. Gantz
*Assistant Examiner*—G. J. Crasanakis
*Attorney*—Roy J. Ott and Pearlman and Stahl

[57] ABSTRACT

A catalyst composition comprising (1) aluminum halo bromides such as aluminum bromide and (2) sulfur oxo halides such as sulfurylfluorochloride stabilizes high alkyl carbonium ion concentrations. The catalyst is useful in isomerization processes for converting normal paraffins and naphthenes to isoparaffins and highly branched naphthenes.

5 Claims, No Drawings

CATALYST MIXTURE OF ALUMINUM HALO BROMIDE AND SULFUR OXO HALIDE AND ITS USE IN ISOMERIZATION

CROSS-REFERENCE TO RELATED APPLICATIONS

This is a continuation of application Ser. No. 862,046, filed Sept. 29, 1969, now abandoned.

BACKGROUND OF THE INVENTION

1. Field of the Invention

This invention concerns a new catalyst system and the utilization thereof. More particularly, the invention relates to aluminum halo bromide-sulfur oxo halide catalyst systems which are useful in hydrocarbon conversion processes. In a more specific aspect, the invention is concerned with aluminum bromide-sulfurylfluorochloride systems and their use as catalysts for promoting the isomerization of normal paraffins and naphthenes.

2. Description of the Prior Art

It is well known that the more highly branched isomers of the paraffinic hydrocarbons occurring in petroleum gasoline fractions are more valuable than the corresponding slightly branched or straight chain hydrocarbons because of their higher octane ratings. The demand for motor fuels of greater octane number has increased markedly as the automotive industry has provided gasoline engines with increasingly higher compression ratios to attain greater efficiency. One of the economically important ways in which the increased demands for high octane fuels can be met is through the isomerization of the light naphtha components of such fuels.

It may be generally stated that the isoparaffinic and branched chain paraffin hydrocarbons are of greater commercial value to the petroleum industry than the corresponding straight chain hydrocarbons. Thus, for example, 2,2-dimethyl-butane has a higher octane rating than the isomeric normal hexane. Isobutane is more valuable than normal butane since the former can be used as the basis for the preparation of eight-carbon-atom branched chain hydrocarbons by alkylation with butylene.

The isomerization of normal paraffins and naphthenic hydrocarbons into the corresponding branched chain homologs is well known. For effecting the isomerization, it is customary to employ certain metal halides, particularly aluminum chloride or aluminum bromide, in conjunction with certain promoters, such as hydrogen chloride, hydrogen bromide, water or alkyl halides. Insofar as the isomerization of light naphthas is concerned, the lower the temperature of isomerization, within limits, the more favorable is the equilibrium for converting straight chain paraffin hydrocarbons into isomers of high octane rating.

The catalyst system of the present invention is more reactive than a conventional Friedel-Crafts catalyst using aluminum chloride or aluminum bromide and has unusual capabilities. For example, the catalyst system of the invention has been found to produce and stabilize higher concentrations of alkyl carbonium ions than any conventional Friedel-Crafts catalyst system using these acids which has been employed heretofore. These ions may be seen by conventional nuclear magnetic resonance spectroscopy at concentrations of 0.1 to 1.0 moles/liter or greater in the present system whereas they can hardly be seen at all in other systems such as $AlBr_3$ - 1,2,4-trichlorobenzene which is a known isomerization catalyst.

SUMMARY OF THE INVENTION

It has now been found that mixtures of (1) aluminum halo bromides and (2) sulfur oxo halides produce and stabilize unusually high carbonium ion concentrations. The composition of the invention is particularly useful as a catalyst for the isomerization of normal paraffins and naphthenes to the corresponding branched chain homologs.

The aluminum halo bromide catalyst component includes those compounds having the stoichiometric formula: $AlBr_aY_b$ where Y represents fluorine, chlorine and/or iodine, $a$ is an integer from 1 to 3 and $b$ is an integer from 0 to 2 and the sum of $a$ and $b$ is 3. Specific examples of these compounds include aluminum bromide, aluminum dibromochloride, aluminum bromodichloride, aluminum dibromofluoride and mixtures thereof. Aluminum bromide is preferred.

The sulfur oxo halide of the invention has the formula: $SO_cX_d$ where $c$ is 1 or 2, X is fluorine, chlorine, bromine or combinations thereof and $d$ is 1 or 2 provided that $d$ is 1 when X represents two different halides. Examples of such compounds include sulfurylfluorochloride ($SO_2FCl$), sulfurylfluoride ($SO_2F_2$), thionylfluoride ($SOF_2$), sulfurylfluorobromide ($SO_2FBr$), and the like. It is preferred, however, to use sulfurylfluorochloride.

In general, the catalyst system of the invention may be prepared by simple mixing of the aluminum halo bromide and sulfur oxo halide under temperature and pressure conditions at which the sulfur oxo halide is in a liquid state. For example, mixtures of aluminum bromide and sulfurylfluorochloride can be conveniently prepared by condensing sulfurylfluorochloride vapor over solid aluminum bromide at a temperature of $-50°$ C. $-$ $0°$ C. The mixture is then stirred for several minutes to produce a liquid solution of aluminum bromide and sulfurylfluorochloride.

The catalyst system of the invention is preferably a liquid solution of the aluminum halo bromide in the sulfur oxo halide. The amount of the aluminum halo bromide, e.g., aluminum bromide, dissolved in the sulfur oxo halide, e.g., sulfurylfluorochloride, can range from a very dilute solution, e.g., < 0.01 molar, of aluminum halo bromide to a saturated solution of aluminum halo bromide. It will generally be convenient to employ the catalyst system of the invention in concentrations ranging from 0.5 to 3.0 molar, preferably 1 to 2 molar, where the term "molar" herein refers to the number of moles of the aluminum halo bromide in 1,000 cubic centimeters of aluminum halo bromide-sulfur oxo halide solution.

The hydrocarbon conversion process of this invention comprises contacting a hydrocarbon feed with the aforedescribed catalyst at conditions of temperature and pressure wherein the catalyst is a liquid. In one embodiment of the invention, a hydrocarbon feed comprising a $C_4$-$C_7$ normal paraffin and/or $C_6$-$C_{10}$ naphthene particularly n-pentane, n-hexane, n-heptane and/or cyclohexane, cycloheptane, cyclooctane, methylcyclononane, is contacted with the aforedescribed catalyst to effect the liquid phase isomerization of the normal paraffins and/or naphthenic compounds. The reaction conditions desirable for isomerization are in the range of $-50°$ to $50°$ C., preferably $-30°$ to $20°$ C., and pressures sufficient to maintain the reactants and catalyst in the liquid state. In general, pressures between 0 and 100 psig will be sufficient. The time of contact is subject to wide variation, the length of residence being dependent in part upon the temperature and catalyst concentration employed. In general, contact times between about 10 minutes and 5 hours, usually ½ to 2 hours are employed.

Suitable feeds for the purposes of the present invention will contain normal paraffinic hydrocarbons or naphthenic hydrocarbons or mixtures thereof. The normal paraffinic hydrocarbons will suitably have about four to seven carbon atoms in the molecule and may be exemplified by normal pentane, normal hexane and normal heptane. While the feed may substantially comprise a purified normal paraffinic hydrocarbon stream, it is also contemplated that mixtures of various paraffinic hydrocarbons be employed, and that other hydrocarbons commonly found in conventional petroleum hydrocarbon streams be present. The feed stream can, for example, comprise a refinery hexane cut or a light naphtha feed which initially can contain other hydrocarbon materials such as olefins, aromatic hydrocarbons, etc. Additionally, the feed stream can contain both paraffinic and naphthenic hydrocarbons. Thus, the feed stream can also substantially comprise a naphthenic hydrocarbon or mixture of various naphthenic hydrocarbons. Typical examples of naphthenic hydrocarbons which can be successfully isomerized in accordance with the present invention include cyclohexane, cycloheptane, cyclooctane, etc., and their alkyl derivatives, such as methylcyclohexane, methylcyclopentane, ethylcyclohexane, dimethylcyclopentane, etc.

The amount of the aluminum halobromide-sulfuroxohalide catalyst contacted with the hydrocarbon feed may range from 0.3 to 10 parts by weight of the catalyst to 1 part by weight of the isomerable portion of the feed, i.e., $C_4$–$C_7$ paraffin and/or $C_6$–$C_{10}$ naphthene. Preferably, the amount of the catalyst will range from 2 to 4 parts by weight to 1 part by weight of the isomerable portion of the feed.

The feed to be isomerized will preferably contain a conventional isomerization promoter such as hydrogen chloride, tertiary butyl chloride, $H_2O$, t-amyl alcohol, and the like. The feed may also contain various cracking inhibitors such as cyclohexane, methylcyclopentane, methylcyclohexane, and the like.

The process of the invention is conducted as a batch or continuous operation. The apparatus employed may be of a conventional nature and may comprise a single reactor equipped with efficient stirring devices, such as mechanical agitator, jets of restricted internal diameter, turbo mixers, etc. Unreacted reactants, catalysts, promoter, inhibitor and heavier products of the reaction may be separated from the desired isomeric product and from one another such as by distillation and returned in whole or in part to the isomerization zone. The resultant product may be further processed as by alkylation and the like, or be employed directly as a high octane gasoline blending agent.

The invention will be further understood by reference to the following examples which include a preferred embodiment of the invention.

DESCRIPTION OF THE PREFERRED EMBODIMENTS

EXAMPLE 1

As a specific example of a normal paraffin isomerization reaction, a mixture of 2.5 milliliters of normal hexane inhibited with 1 wt. percent of methylcyclopentane and 5 milliliters of a 2 molar aluminum bromide-sulfurylfluorochloride solution containing tertiary butyl chloride present in a 0.1 molar concentration (based on amount of $AlBr_3$—$SO_2FCl$ solution) was stirred in a 25 milliliter glass reactor for 1 hour at $-10°$ C. and the partial pressure of the system. The reaction was then terminated by the addition of 15 milliliters of a 50 percent sodium hydroxide solution. The run was repeated with the exception that the reaction time was about 9 hours and the temperature was maintained at $-30°$ C. The results obtained are given below wherein the reaction carried out at $-10°$ C. is designated as Run A and the reaction carried out at $-30°$ C. is designated as Run B.

ISOMERIZATION OF NORMAL HEXANE

| | Run A | Run B |
|---|---|---|
| Normal Hexane Conversion, Wt. % | 49.8 | 65.7 |
| Selectivity to $C_6$ Isomers | 84.9 | 92.3 |
| Analysis of $C_6$ Product Fraction, Vol. % | | |
| 2,2-dimethyl butane | 15.3 | 27.9 |
| 2,3-dimethyl butane + 2-methyl pentane | 23.4 | 28.5 |
| 3-methyl pentane | 7.0 | 8.0 |
| n-hexane | 54.3 | 36.1 |

EXAMPLE 2

This example further illustrates isomerization reactions carried out with the catalyst of this invention.

In this example, normal pentane, normal hexane and normal heptane were separately contacted with the aluminum bromide-sulfurylfluorochloride catalyst composition of Example 1. The reaction conditions and the relative proportions of feed and catalyst were as given in Run B. After a reaction time of only about 5 minutes, the amount of n-pentane, n-hexane and n-heptane isomerized were 23.2 wt. percent, 19.9 wt. percent and 24.0 wt. percent, respectively.

The catalyst of the invention besides being an effective isomerization catalyst, may be used in alkylation reactions such as the synthesis of branched chain hydrocarbons by reaction of isoparaffinic hydrocarbons with olefins. It is to be understood, therefore, that the above examples have been presented primarily for the purpose of illustrating the invention and that its scope is not to be limited thereto but is to be determined by the appended claims.

What is claimed is:

1. A composition comprising a mixture of (1) an aluminum halobromide having the stoichiometric formula: $AlBr_aY_b$ where Y represents fluorine, chlorine or iodine, $a$ is an integer from 1 to 3, $b$ is an integer from 0 to 2 and the sum of $a$ and $b$ is 3 and (2) a compound selected from the group consisting of sulfurylfluorochloride, sulfurylfluoride, thionylfluoride, sulfurylfluorobromide.

2. The composition of claim 1 wherein said component (2) is sulfurylfluorochloride.

3. The composition of claim 2 wherein said component (1) is aluminum bromide.

4. An isomerization process which comprises contacting a feed containing a $C_4$–$C_7$ normal and/or a $C_6$–$C_{10}$ naphthenic paraffin with a catalyst composition comprising a mixture of (1) an aluminum halobromide having the stoichiometric formula: $AlBr_aY_b$ where Y represents fluorine, chlorine or iodine, $a$ is an integer from 1 to 3, $b$ is an integer from 0 to 2 and the sum of $a$ and $b$ is 3 and (2) a compound selected from the group consisting of sulfurylfluorochloride, sulfurylfluoride, thoinylfluroide, and sulfurylfluorobromide.

5. The process of claim 4 wherein said component (2) is sulfurylfluorochloride.

* * * * *